United States Patent [19]

Yamada et al.

[11] Patent Number: 4,592,389
[45] Date of Patent: Jun. 3, 1986

[54] ROTARY VALVE

[75] Inventors: Ryuichi Yamada, Aichi; Toshio Hirokawa; Toshihiro Goto, both of Okazaki, all of Japan

[73] Assignee: Toyoda Koki Kabushiki Kaisha, Kariya, Japan

[21] Appl. No.: 713,822

[22] Filed: Mar. 20, 1985

[30] Foreign Application Priority Data

Mar. 22, 1984 [JP] Japan .................. 59-41649[U]

[51] Int. Cl.$^4$ .................. F16K 11/22; F16C 33/02
[52] U.S. Cl. .................. 137/625.22; 137/625.21; 384/295; 384/296; 384/903
[58] Field of Search .............. 384/295, 296, 537, 584, 384/585, 903; 277/152, 153, 166, 136, 137; 137/625.21, 625.22, 625.24, 625.31, 625.32, 625.3; 29/511, 509

[56] References Cited

U.S. PATENT DOCUMENTS

| 944,423 | 12/1909 | Feix | 29/509 X |
|---|---|---|---|
| 1,005,954 | 10/1911 | Fritz | 384/296 X |
| 1,649,409 | 11/1927 | Jardine | 29/511 |
| 1,947,973 | 2/1934 | Davis | 137/625.24 |
| 2,724,893 | 11/1955 | O'Connor et al. | 29/511 |
| 4,009,641 | 3/1977 | Rohde et al. | 91/375 A |
| 4,452,274 | 6/1984 | Haga et al. | 137/625.22 |

FOREIGN PATENT DOCUMENTS 58-22486 12/1983 Japan .

*Primary Examiner*—Martin P. Schwadron
*Assistant Examiner*—John S. Starsiak, Jr.
*Attorney, Agent, or Firm*—Oblon, Fisher, Spivak, McClelland & Maier

[57] ABSTRACT

A rotary valve which includes a valve sleeve having a cylindrical internal cavity and a plurality of axial grooves formed on the wall surface of the internal cavity; a valve spool fitted in the internal cavity of the valve sleeve and rotatable relative to the valve sleeve for controlling flow of a pressurized fluid through the valve; an annular groove formed at least at one end of the valve sleeve and having a diameter larger than that of the internal cavity; a bush fitted in the annular groove and having a hole of the same diameter as the internal cavity of the valve sleeve; a seal material interposed between engaging surfaces of the bush and annular groove; chamfered surface formed at the outer corner edge of the bush; and an annular thin-wall portion formed at the end of the valve sleeve and bent radially inward to retain the bush in the annular groove.

2 Claims, 4 Drawing Figures

ROTARY VALVE

BACKGROUND OF THE INVENTION

1. Field of the Invention

This invention relates to a rotary valve suitable for use in power steering systems.

2. Description of the Prior Art

Conventional rotary valves of this sort are generally provided with axial grooves on the inner periphery of a cylindrical bore of a valve sleeve member, closing the end of the axial grooves by bushes which are pressed in annular grooves formed at the ends of the valve sleeve member. However, if a gap space exists between the valve sleeve member and an engaging end face of the bush, leaks take place between adjacent axial grooves through the gap space, giving rise to problems such as failure to ensure required steering characteristics and the production of hissing noises.

SUMMARY OF THE INVENTION

It is therefore an object of the present invention to provide an improved rotary valve construction, which has the gaps between a valve sleeve member and end faces of bushes sealed securely in a simplified manner to preclude leaks of the pressurized operating fluid.

Briefly stated, the rotary valve according to the present invention essentially comprises: a valve sleeve member having a cylindrical internal cavity and a number of axial grooves formed on the wall surface of the internal cavity; a valve spool fitted in the internal cavity of the valve sleeve and rotatable relative to the valve sleeve for controlling the flow of a pressurized fluid through the valve; an annular groove formed at least at one end of the valve sleeve and having a diameter larger than that of the internal cavity; a bush fitted in the annular groove and having a hole of the same diameter as the internal cavity; a seal material interposed between engaging surfaces of the annular groove and bush; a chamfered surface formed around an outer corner edge of the bush; and an annular thin-wall portion formed on the outer end face of the bush and bent radially inward to retain the bush securely in position by abutting engagement therewith.

The above and other objects, features and advantages of the invention will become apparent from the following description and appended claims, taken in conjunction with the accompanying drawings which show by way of example a preferred embodiment of the invention.

DESCRIPTION OF PREFERRED EMBODIMENT

Figure 1:
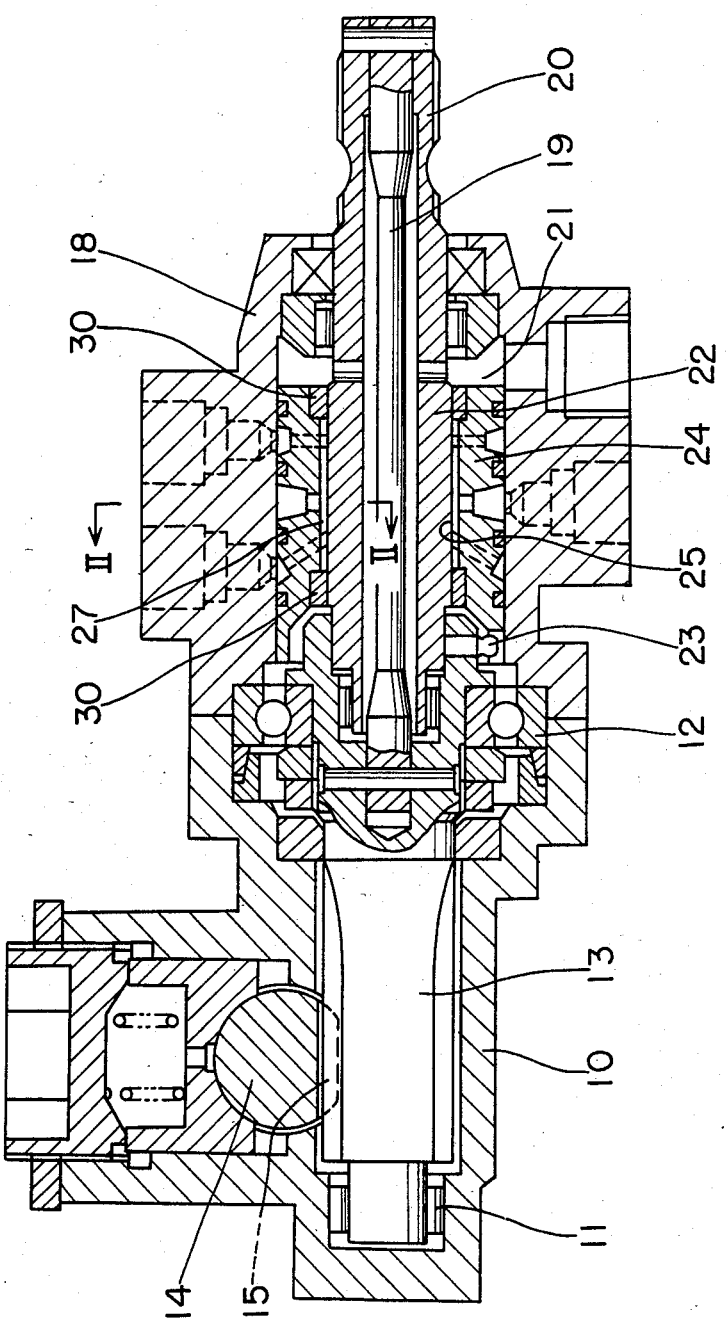
FIG. 1 is a schematic longitudinal section of a power steering mechanism incorporating a rotary valve embodying the present invention.
Figure 2:
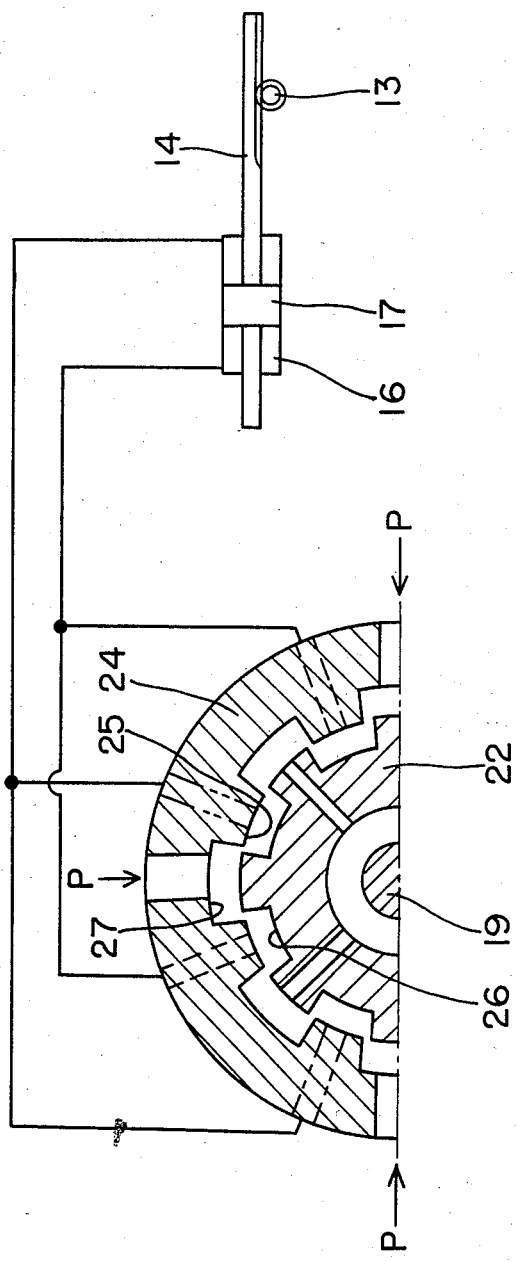
FIG. 2 is an enlarged sectional view taken on line II—II of FIG. 1.

Referring to FIGS. 1 and 2, there is shown a power steering mechanism employing a rotary valve according to the invention as a control valve, in which indicated at 10 is a casing of the power steering itself. A pinion shaft 13 is rotatably supported in the casing 10 through a pair of bearings 11 and 12. The pinion shaft 13 is meshed with rack teeth on a rack shaft 14 which extends in a direction perpendicular to the pinion shaft 13. As shown particularly in FIG. 2, the rack shaft 14 is connected to a piston 17 of a power cylinder 16, and has its opposite ends connected to steerable wheels through conventional steering link mechanisms.

On the other hand, accommodated in a valve housing 18 which is fixed to the casing 10 are a steering shaft 20 which is flexibly connected to the pinion shaft 13 through a torsion bar 19 and a rotary valve 21 which is rotated by the steering shaft 20. This rotary valve 21 is mainly constituted by a valve spool member 22 which is formed integrally with the steering shaft 20, and a valve sleeve member 24 which is connected to the pinion shaft 13 through a connecting pin 23. The valve spool member 22 is rotatably fitted and supported in a cylindrical cavity 25 which is formed in the valve sleeve member 24, for rotation relative to the latter.

As shown in FIG. 2, a plurality of axial grooves 26 are formed on the outer periphery of the valve spool member 22 at uniform intervals around the circumference thereof. Similarly, a plurality of axial grooves 27 are formed on the inner wall of the valve sleeve member 24 at uniform intervals around the inner periphery thereof. Upon rotating the valve spool member 22 and valve sleeve member 24 relative to each other, the grooves 26 and 27 are opened and closed to control the flow of the fluid pressure to and from the power cylinder 16.

Figure 3:
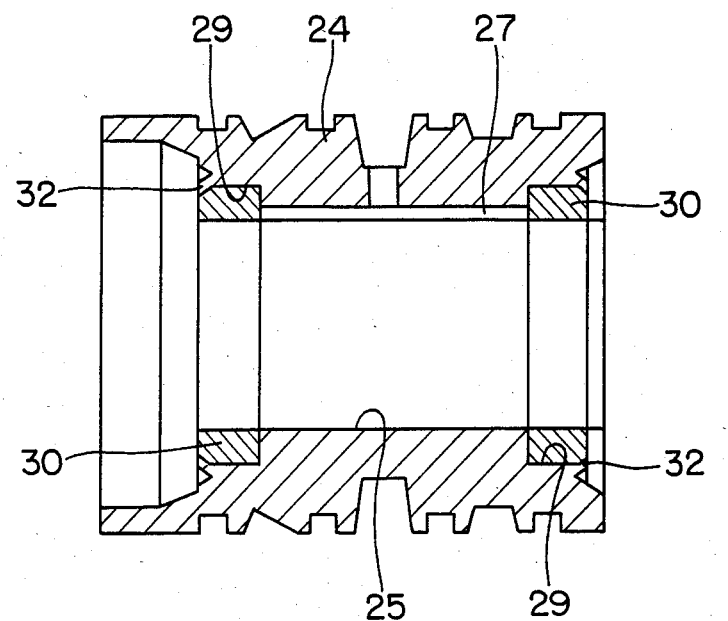
FIG. 3 is a schematic longitudinal section of a valve sleeve member with bushes securely fixed thereto.
Figure 4:
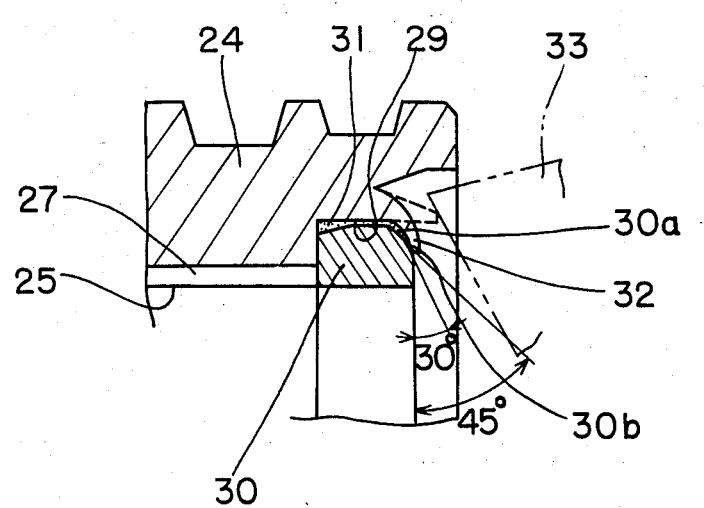
FIG. 4 is an enlarged sectional view of a bush securely held in position.

Further, annular bush-receiving grooves 29 of a diameter larger than the inner cavity 25 are formed at opposite ends of the valve sleeve member 4 as illustrated in FIG. 3, for fittingly receiving bushes 30. As shown particularly in FIG. 4, the outer marginal edge of each bush 30 is chamfered on the side remote from the cylindrical cavity 25 to provide a first tapered surface 30a which is inclined at an angle of 45° and, contiguous to the first tapered surface 30a, a second tapered surface 30b which is inclined at an angle of 30°.

The valve sleeve member 24 is provided with caulking projections 32 (annular thin-wall portions) at the opposite ends, which are to be caulked by a die 33 as indicated in phantom to abut the fore end portions of the caulking projections 32 against the second tapered surfaces 30b of the bushes 30. By caulking the projections onto the tapered surfaces 30b in this manner, the bushes 30 are pressed against the end faces of the annular grooves 29 and prevented from being dislodged from the valve sleeve member 24.

Sealing material 31 which is applied on the engaging surface before fitting each bush is securely gripped between the fitting groove 29 and the bush 30, and more particularly between the end faces of the annular fitting groove 29 and the bush 30 and between the annular groove 29 and the outer periphery of the bush 30, thereby securely sealing the ends of the respective axial grooves 27 to prevent leaks of the pressurized fluid.

As described hereinbefore, each bush 30 is provided with a first tapered surface which is formed at a corner edge with an angle of inclination of 45° and a second tapered surface 30b which is formed contiguously to the first tapered surface 30a with an angle of inclination of 30°, and the fore end of the caulking projection 32 is abutted against the second tapered surface 30b. This arrangement permits minimization of the bending rate of the caulking projection 32 to prevent its cracking or fracturing.

As is clear from the foregoing description, the rotary valve according to the invention employs a valve sleeve member having annular grooves formed at opposite ends thereof and having a diameter larger than that of its internal cavity, and a pair of bushes fitted in the annular grooves in engagement with the inner peripheries and end faces thereof through seal material, the outer edges of the bushes being chamfered to form tapered surfaces and end portions of the valve sleeve member being caulked toward the tapered surfaces of the bushes to prevent dislodging of the bushes and to press same against the end faces of the annular grooves. Consequently, the ends of a plurality of axial grooves are sealed securely in a simplified manner to prevent leaks of the pressurized fluid.

In addition, according to the present invention, caulking projections of the sleeve valve member are abutted against chamfered edges of the bushes, thereby minimizing the bending rate of the caulking projections to preclude cracking or facture thereof.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary valve, comprising:
a valve sleeve having a cylindrical internal cavity and a plurality of axial grooves formed on a wall surface of said internal cavity;
a valve spool fitted in said internal cavity of said valve sleeve and rotatable relative to said valve sleeve for controlling flow of a pressurized fluid through said valve;
an annular groove formed at least at one end of said valve sleeve and having a diameter greater than that of said internal cavity;
a bush fitted in said annular groove and having a hole formed therein of the same diameter of said internal cavity and a chamfered surface formed at an outer cover edge of said bush;
seal means interposed between engaging surfaces of said bush and said annular groove; and
an annular thin wall portion formed at the end of said valve sleeve and bent radially inward to retain said bush in said annular groove wherein said chamfered surface includes a first chamfered surface inclined at a first angle within an outer end face of said bush and a second chamfered surface formed contiguously with said first chamfered surface at a second angle with said outer end face of said bush, said second angle being greater than said first angle.

2. The rotary valve of claim 1, wherein said annular thin-wall portion includes a bent portion which abuts with said first chamfered surface of said bush.

* * * * *